US009940790B2

(12) United States Patent
Orcutt et al.

(10) Patent No.: US 9,940,790 B2
(45) Date of Patent: Apr. 10, 2018

(54) ASSIGNING A SECURE ROOM TO A PLAYER IN ONLINE POKER GAME

(71) Applicant: Zynga Inc., San Francisco, CA (US)

(72) Inventors: Jason Orcutt, San Francisco, CA (US); Fabien Renaud, San Francisco, CA (US); Sergey Edunov, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 15/810,511

(22) Filed: Nov. 13, 2017

(65) Prior Publication Data

US 2018/0068530 A1 Mar. 8, 2018

Related U.S. Application Data

(63) Continuation of application No. 14/568,788, filed on Dec. 12, 2014, now Pat. No. 9,842,471.

(60) Provisional application No. 62/058,005, filed on Sep. 30, 2014.

(51) Int. Cl.
*G06F 19/00* (2018.01)
*G07F 17/32* (2006.01)

(52) U.S. Cl.
CPC ...... *G07F 17/3276* (2013.01); *G07F 17/3225* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 2006/0287104 A1* | 12/2006 | White | G07F 17/32 | 463/42 |
| 2007/0060363 A1* | 3/2007 | Nguyen | G07F 17/32 | 463/42 |
| 2007/0167210 A1* | 7/2007 | Kelly | G07F 17/32 | 463/16 |
| 2008/0182644 A1* | 7/2008 | Lutnick | G07F 17/3258 | 463/20 |
| 2009/0131175 A1* | 5/2009 | Kelly | G07F 17/3267 | 463/42 |
| 2010/0062838 A1* | 3/2010 | Nguyen | G07F 17/32 | 463/25 |
| 2015/0012307 A1* | 1/2015 | Moss | G06Q 10/02 | 705/5 |

* cited by examiner

*Primary Examiner* — Paul A D'Agostino
(74) *Attorney, Agent, or Firm* — Martine Penilla Group, LLP

(57) ABSTRACT

Methods, systems, and computer programs are presented for selecting game servers and assigning seats to players in poker tables. One method includes an operation for receiving table parameters from a user in a poker game. The table parameters identify the characteristics of a desired table for playing poker by the user. A distance from the desired table to the available poker tables is calculated, where the distance based on the similarity between the desired table and each of the available poker tables. Each of the available poker tables is served by one of a plurality of servers. Additionally, the method includes operations for selecting candidate tables from the available poker tables based on the calculated distances, and for selecting a playing table from the candidate tables at random. The user is then connected to a server that serves the selected playing table.

20 Claims, 11 Drawing Sheets

Table Unavailable Dialogue

Table Unavailable Dialogue

Table Allocation Failure

ASSIGNING A SECURE ROOM TO A PLAYER IN ONLINE POKER GAME

CLAIM OF PRIORITY

This application is a continuation of and claims priority to U.S. application Ser. No. 14/568,788, filed on Dec. 12, 2014, entitled "ASSIGNING A SECURE ROOM TO A PLAYER IN ONLINE POKER GAME"; which claims priority from U.S. Provisional Patent Application No. 62/058,005, filed Sep. 30, 2014, and entitled "ASSIGNING A SECURE ROOM TO A PLAYER IN ONLINE POKER GAME," all of which are herein incorporated by reference in their entireties.

BACKGROUND

Field of the Invention

The present embodiments relates to methods, systems, and programs for improving performance of an online poker game, and more particularly, methods, systems, and computer programs for allocating players to servers and poker tables.

Description of the Related Art

In some online poker games, users can play with their friends by going to an online poker game and selecting to play in the same server and the same table as friends. However, this is also the method used by illegal sellers of poker chips to meet with potential clients. Once an illegal seller meets with a player in a poker table, the seller transfers chips to the buyer by losing poker hands.

Additionally, sometimes players select a poker table to play the game where the poker table appears to have an empty seat. However, with thousands of players in the same online game, sometimes two or more players go to a poker room at the same time, and one or more of them find out that there are no empty seats at the table. This causes frustration and waste of time, because players have to go back to the lobby and start the table search again.

Sometimes the online game provides the option to let the game decide where to sit the player, which expedites the process. However, the same problem may happen, where the game selects a table and takes the player to that room, only to find that the table is full.

A solution is needed that improves the chance that a player finds the desired poker table quickly. Also, it is an objective to decrease the number of illegal sales by making it harder to transfer chips from illegal resellers.

It is in this context that embodiments arise.

SUMMARY

Methods, devices, systems, and computer programs are presented for selecting servers and for assigning seats to players in poker tables. It should be appreciated that the present embodiments can be implemented in numerous ways, such as a method, an apparatus, a system, a device, or a computer program on a computer readable medium. Several embodiments are described below.

In one embodiment, a method is provided. The method includes operations for receiving table parameters from a user in a poker game, the table parameters identifying characteristics of a desired table for playing poker by the user, and for calculating a distance from the desired table to each from plurality of available poker tables. The distance is based on a similarity between the desired table and the each available poker table, where each available poker table is served by one of a plurality of servers. Additionally, the method includes operations for selecting a plurality of candidate tables from the plurality of available poker tables based on the calculated distances, and for selecting a playing table from the plurality of candidate tables at random. The user is then connected to a first server serving the playing table for playing the poker game in the playing table.

In another embodiment, a system includes a login server, a web server, and a master control server. The login server is for receiving table parameters from a client device utilized by a user in a poker game. The table parameters identify the characteristics of a desired table for playing poker by the user, and the web server is for managing available stake levels at plurality of available poker tables. Each available poker table is served by one of a plurality of servers. Further, the master control server is operable to calculate a distance from the desired table to each from plurality of available poker tables, the distance based on a similarity between the desired table and the each available poker table. The master control server is further operable to select a plurality of candidate tables from the plurality of available poker tables based on the calculated distances, and to select a playing table from the plurality of candidate tables at random. The client device connects the user to a first server serving the playing table for playing the poker game in the playing table.

In yet another embodiment, a non-transitory computer-readable storage medium, storing a computer program, includes program instructions for receiving table parameters from a user in a poker game, the table parameters identifying characteristics of a desired table for playing poker by the user. The storage medium further includes program instructions for calculating a distance from the desired table to each from plurality of available poker tables, the distance being based on a similarity between the desired table and the each available poker table, each available poker table being served by one of a plurality of servers. Further yet, the storage medium includes program instructions for selecting a plurality of candidate tables from the plurality of available poker tables based on the calculated distances, and program instructions for selecting a playing table from the plurality of candidate tables at random. The storage medium further includes program instructions for connecting the user to a first server serving the playing table for playing the poker game in the playing table.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for selecting game servers and assigning seats to players in poker tables. It will be apparent, that the present embodiments may be practiced without some or all of these specific details. In other instances, well known process operations have not been described in detail in order not to unnecessarily obscure the present embodiments.

Embodiments presented herein improve the availability of selecting poker tables when a player enters the game. Additionally, the ability to select a server to set up meetings between malicious chips sellers and chip buyers is decreased to minimize game losses due to illegal activities.

The embodiments presented herein allow the player to select the desired parameters for a poker table, and then the game determines which the best servers to host the player are. From the candidate servers, one server is chosen at random for assigning a seat for playing to the player.

Figure 1A:
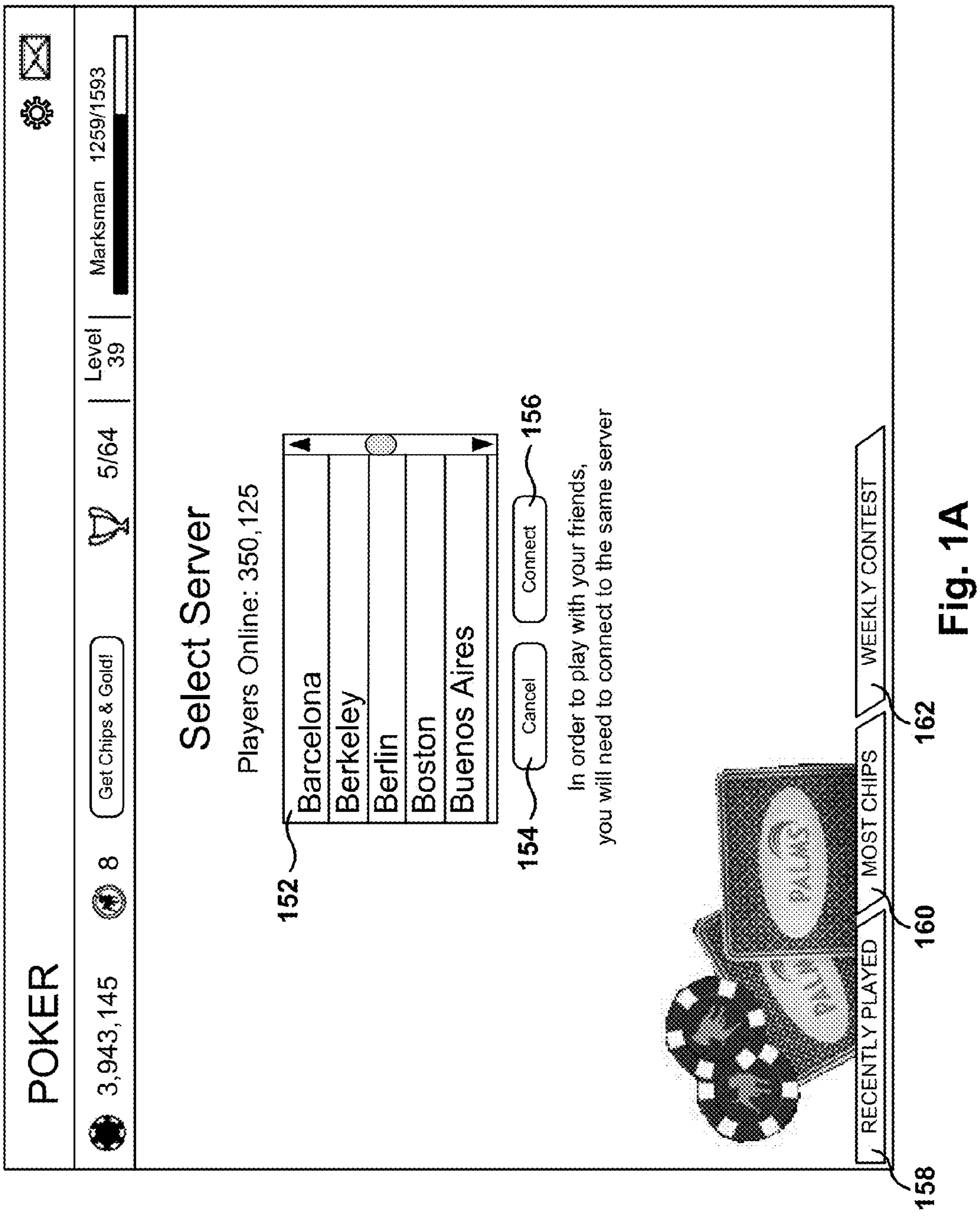
FIG. 1A is a graphical user interface for selecting a server to play poker, according to one embodiment.

FIG. 1A is a graphical user interface for selecting a server to play poker, according to one embodiment. In some implementations, when the player enters the game, a server selection menu 152 is presented to the user. The server selection menu lists all the available servers for the user. After the user makes the selection of the server, the user is able to select the connect button 156 to enter that server. If the user does not want to select the server, the cancel button will take the player to another place in the game (e.g., a lobby).

In addition, the welcome interface includes other options, such as identify recently played tables 158, select tables with the most chips 160, and enter the weekly contest 162.

Typically, the user will select a server that is near the geographical location where the user is playing, hoping that the connection speeds are faster. However, the server may be congested and there could be other servers that would be better for the player.

Additionally, if two players want to play together, the players will have to agree on selecting a common server and then find a room where they can play together.

Typically, when an illegal seller of game chips wants to sell chips, the illegal seller performs a commercial transaction on a webpage to collect money for the transfer of chips and then provides instructions to the player to go to a particular server in a particular room where the player can meet with the illegal seller, or with several players working under the command of the illegal seller, to a stage a game where the illegal seller transfer chips to the buyer.

In some embodiments, the player first selects the table stakes (not shown) desired to play the game before selecting the server. For example, the stakes may include the size of the small blind, the maximum number of players on the table, the speed of play (leisurely, standard, fast, very fast, etc.), and/or the number of players currently sitting at the table. After the server is selected, the player is taken to a table with the desired stakes.

Figure 1B:
FIG. 1B illustrates a table unavailable message, according to one embodiment.

FIG. 1B illustrates a table unavailable message, according to one embodiment. FIG. 1B illustrates an error message provided to a player when a table is unavailable. For example, the player selected the desired stakes, selected the server, and when the player joined the server, the desired-stakes table was not available at that server.

Because the selection of the server is independent from the selection of table, this problem may occur as there is no check perform to see if the desired table is available at that server.

In one embodiment, the table unavailable dialogue offers the option to the player to change stakes (i.e., the size of the small blind) to be able to get into a poker table.

Figure 1C:
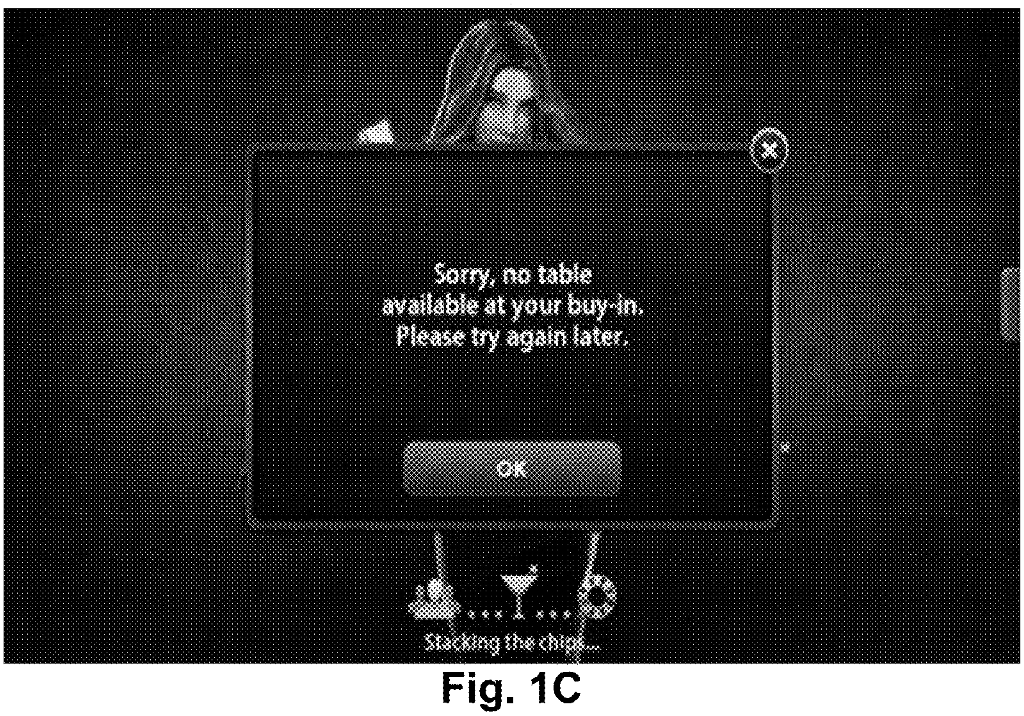
FIG. 1C illustrates a table allocation failure, according to one embodiment.

FIG. 1C illustrates a table allocation failure, according to one embodiment. FIG. 1C illustrates another error provided to the player when the table allocation failure occurs. In this case, the game could not find a table at the selected buy-in value entered by the player. As a result, the player stays in the lobby.

The embodiments presented herein provide improvements to the table allocation process in order to increase the availability of tables for players at their desired stakes. For example, the player is not tied down to selecting a single server, but finding a table for the player involves looking at the different servers and selecting a server that is appropriate for the player at the desired stakes. As used herein, the desired stakes refer to one or more of the size of the small blind, or the minimum amount of buy-in to sit at the table, or the number of players that can sit at the table.

Furthermore, a goal of embodiments presented herein is to decrease the number of table allocation failures, i.e., the number of times players will not get a table. Additionally, another goal of the embodiments presented herein is to enhance user experience by providing a smooth transition when entering the game and providing to the player the table that the player desires. By improving the speed at which players are seated and enhancing the customer experience, an added benefit is the increase in the number of hands played in the game, which means higher income for the game provider.

Figure 1D:
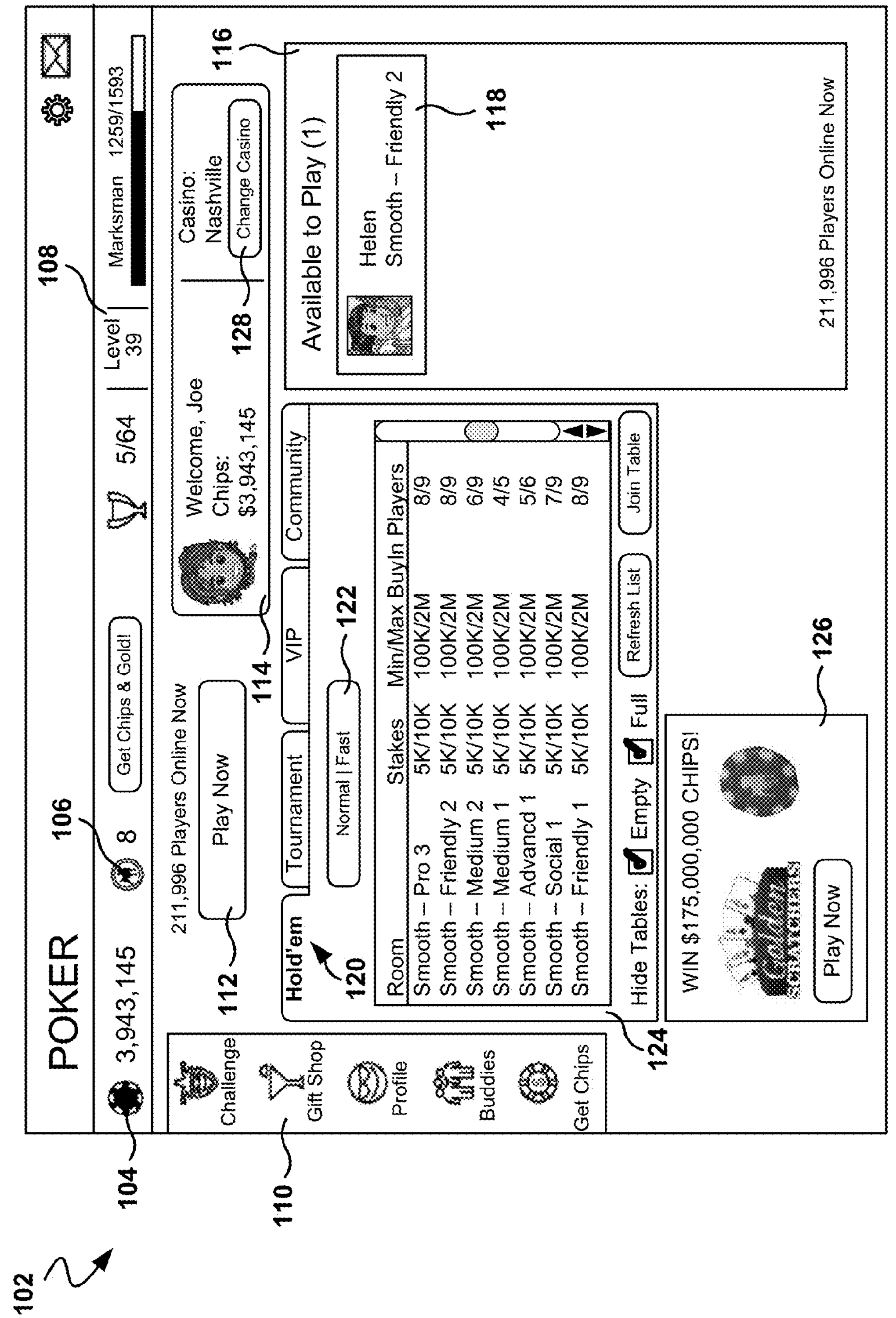
FIG. 1D illustrates an embodiment of a web page for playing a poker game.

FIG. 1D illustrates an embodiment of a webpage 102 for playing a poker game. The online poker game may be accessed in a website of the publisher of the online poker game, or the online poker game may be embedded within the webpage of a social networking site. In some embodiments, after the player selects the server, the player is taken to a lobby, as shown in FIG. 1D, where the player can select a poker table. The illustrated page serves as a portal, also referred to herein as a lobby, for accessing various features of the online poker game.

In one embodiment, the poker game is played with virtual chips 104, which may be purchased with real cash, and may be won or lost while playing the online poker game. The virtual chips may also be utilized to buy items in the online game area. Menu area 110 gives the player options to buy items in the gift shop, buy chips with legal currency, manage the player's profile, etc. In addition, the player may buy a second type of virtual currency 106 to buy items in the game, or gain access to special features. The embodiments presented herein may also be utilized in real-money gambling. The gambling is performed with real money instead of virtual chips.

Webpage 102 shows the lobby of a poker game, which includes several options for the player. From the lobby, the player is able to select a poker table to play poker with other players. Player status area 114 provides information about the player, such as the amount of chips available for playing, the casino (e.g., server) that the player is in, etc. Additional information may also be found in the top information bar, such as level 108 achieved by the player. The change-casino option 128 allows the player to change the casino, e.g., change the server.

The poker table selection area 124 provides the user options to select a poker table. The poker table selection area 124 includes options for playing Texas Hold Them poker 120, playing in a tournament, playing in a VIP table reserved for special players (e.g., players with a minimum number of poker chips), and playing in a community table. In the poker table selection area 124, the tab for playing Texas Hold Them poker 120 is selected and a list of poker tables is provided. Each poker table includes a name, the betting stakes, minimum and maximum buy-in to sit down at the table, and the number of players sitting at the table together with the maximum number of players for the table (e.g., 4/5, which means that 4 players are playing poker in a poker table that holds a maximum of 5 players). In addition, option button 122 enables the player to select tables that play at a first speed (e.g., "Normal") or tables that play at a second speed (e.g., "Fast").

An option "Play Now" to let the game select a table for the player 112 is also provided in webpage 102. In addition, a friend board 116 lists friends of the player that are currently playing poker. The friends of the player may be friends from the social network, or friends from within the game network. If the player selects one of the people listed 118 in friend board 116, the player will be taken to the same poker table where the friend is currently playing. In addition, webpage 102 may include other areas with additional game related information, such as announcement or promotional area 126.

It is noted that the some of the embodiments described herein are described with reference to a poker game. However, the principles presented herein to may be used for other games, such as black jack, roulette, slots etc. In addition, the embodiments presented here may also be used in non-casino games, such as battle games, adventure games, construction games, etc. The embodiments illustrated herein should therefore not be interpreted to be exclusive or limiting, but rather exemplary or illustrative.

Figure 2:
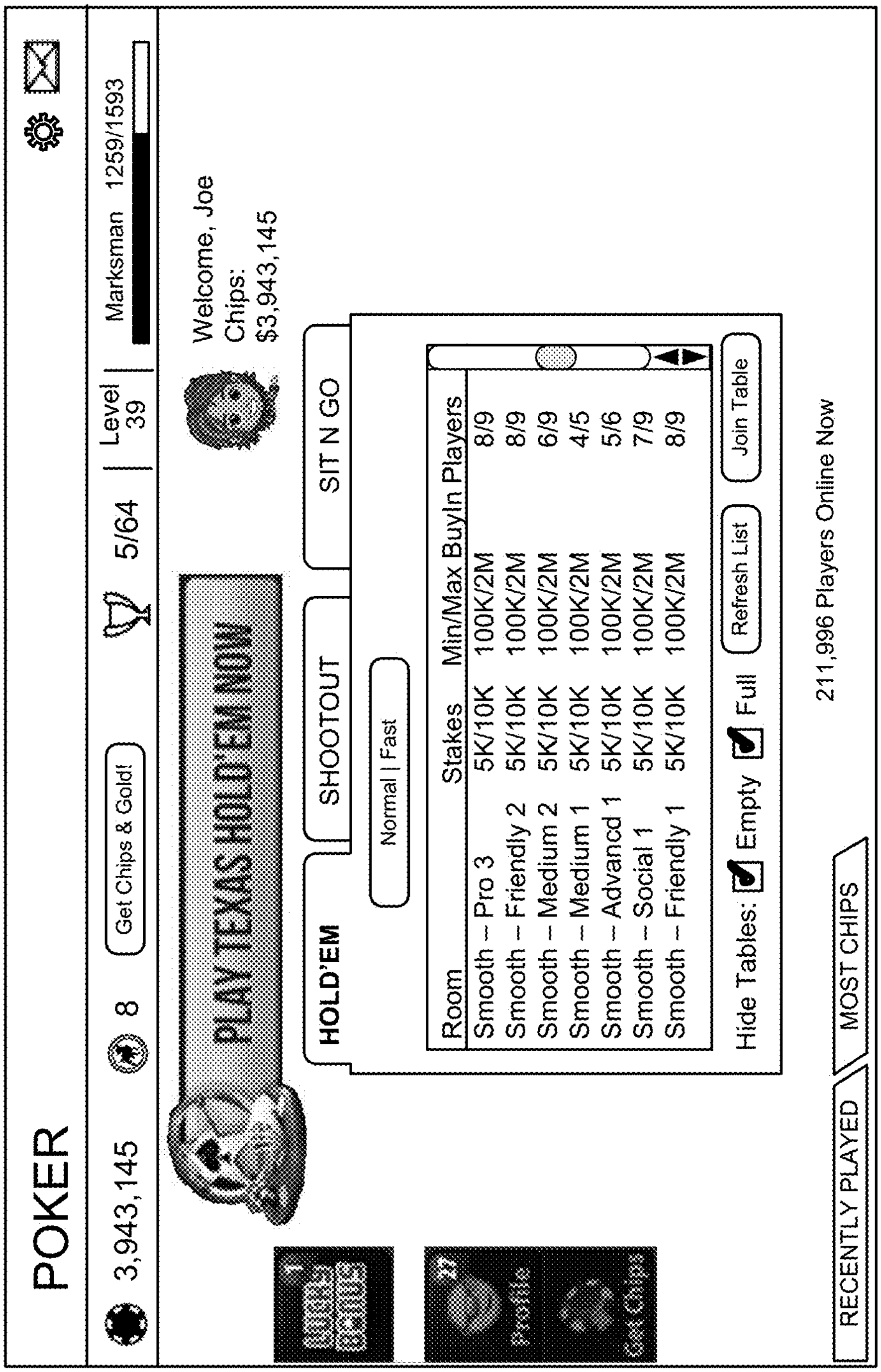
FIG. 2 illustrates an embodiment of a webpage for selecting a poker table without the player selecting a server for playing poker.

FIG. 2 illustrates an embodiment of a webpage for selecting a poker table without the player selecting a server for playing poker. Initially, a player is randomly assigned to a server when the player logs into the game. In one embodiment, a server that is located near the player is selected, or a server that is within the same geography, or a server within the same geography that has lower utilization than other servers. Then a selection page is presented as illustrated in FIG. 2. In this interface, the player is able to select a poker table, including the stakes, the buy-in, the number of players, etc. It is noted that, in one embodiment, the player is not given the option of selecting a server for playing the game.

After the player selects a table and selects the join-table option, a server is selected for those table stakes, and then the player is transferred to the selected server and taken to the selected poker table. In some embodiments, the player doesn't even know in which server the player is playing. The player now selects the type of table that the player wants to play, but not a specific table on a specific server.

The selection of the server has two components: a first component to select a server that best satisfies the player needs, and a second component that is random. By adding the random component, illegal resellers of virtual currency do not know how to find their clients inside the game in order to transfer poker chips.

It is noted that the embodiments illustrated in FIG. 2 are exemplary. Other embodiments may utilize different layouts, additional options, fewer options, etc. The embodiments illustrated in FIG. 2 should therefore not be interpreted to be exclusive or limiting, but rather exemplary or illustrative.

Figure 3:
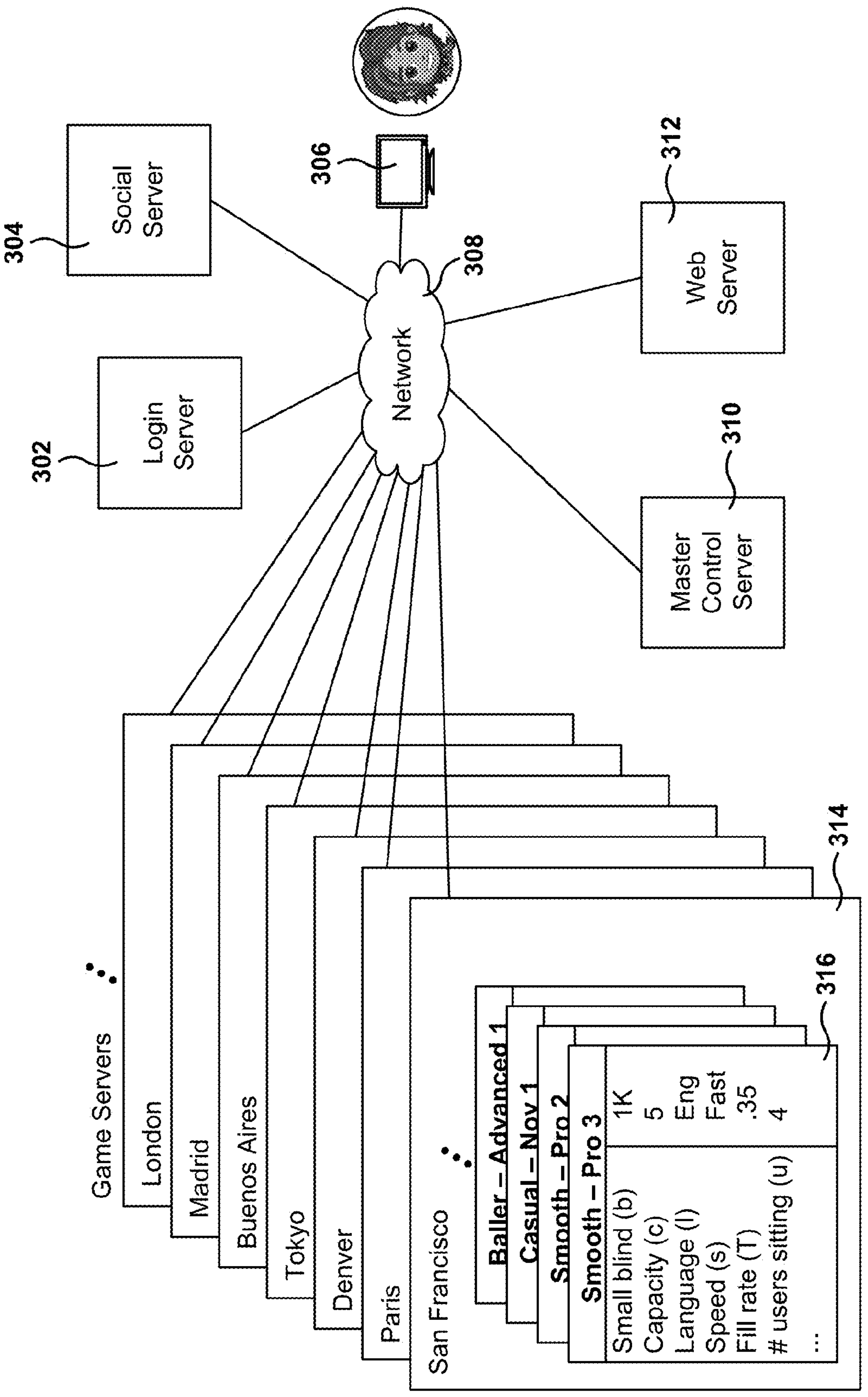
FIG. 3 is a sample architecture for a distributed poker online game, according to one embodiment.

FIG. 3 is a sample architecture for a distributed poker online game, according to one embodiment. In one embodiment, the system includes a login server 302, a social server 304, a master control server 310, a web server 312, and a plurality of game servers 314.

The login server 302 provides the interface to the client device 306 when the player joins the game. For example, the login server provides a login interface to enter the user credentials. The social server 304 provides social information about the user, such as user relations or friends established in a social network. In one embodiment, the user may login into the game via the social server, and the credentials used to join the social network may be used to join the online game.

In one embodiment, all or some of the game servers may also act as a login server. However, the game server where the player logs in may not be the game server where the player may end up playing the game. The player accesses the system via a client device 306 that is coupled to network 308.

In one embodiment, the login server 302 also provides an interface to perform game operations before a server is selected for the player. For example, the interface described above with reference to FIG. 2 may be provided by the login server.

The master control server 310 manages information about the poker table status in the different servers. For example, in one embodiment, the master control server 310 keeps a list of all the available tables in all the active servers, or a subset thereof, in order to assist in the selection of a server and a table for the player. The web server 312 manages a list of available stake levels at the different servers. More details about master control server 310 and web server 312 are provided below with reference to FIG. 5.

Each game server 314 includes a plurality of poker tables 316. For each poker table 316, a plurality of table parameters are defined identifying the properties of the table. In one embodiment, the table parameters includes the size of the small blind (e.g. 1K), the capacity of the table for admitting players (e.g., 5, 9, etc.), the language of the table (e.g., English), the speed of the table at which the game is played (e.g., defining how much time each player has to make decisions during gameplay), the fill rate, and the number of players currently sitting at the table.

In one embodiment, the player has an option to select a table that is almost full, as some players prefer to play in full tables with many players (e.g., 9), while other players would rather play in tables with a fewer number of players.

In one embodiment, the player is given an option to play together with friends in the same poker table. Friends can be identified by relationships established within the online game or relationships established within one or more social networks. When the player enters the game, the game identifies which friends of the player are currently playing, and the player is given the option to select one of the friends for playing together. When the player selects a friend, the game takes the player to the room where the friend is playing. This way, both friends can play together. However, in one embodiment, the friends still do not know in which server they are playing. All they know is that they are playing in the same poker room.

In one embodiment, in order to limit illegal chip sales, the game requires that the player has been friend of another player for a minimum predetermined amount of time in order to be provided with the option to play with a friend. For example, an aging period of three days may be required before the game provides the option to that friend. This way, if a first player becomes a friend of a second player today, the first player will not see the second player in the list of friends until after three days later.

This makes it more difficult for illegal sellers to contact buyers in the game, because buyers want their chips right away after the buyers make a purchase. A waiting period would discourage many players from choosing this option, as the illegal sales is an illegal operation to start with, and the trust of an illegal seller is always questionable.

It is noted that the embodiments illustrated in FIG. 3 are exemplary. Other embodiments may utilize additional servers, or combine the functionality of two or more servers into a single server, or provide the functionality of one server across a plurality of distributed servers. For example, the game servers may be the login servers, without requiring a dedicated login server. The embodiments illustrated in FIG. 3 should therefore not be interpreted to be exclusive or limiting, but rather exemplary or illustrative.

Figure 4:
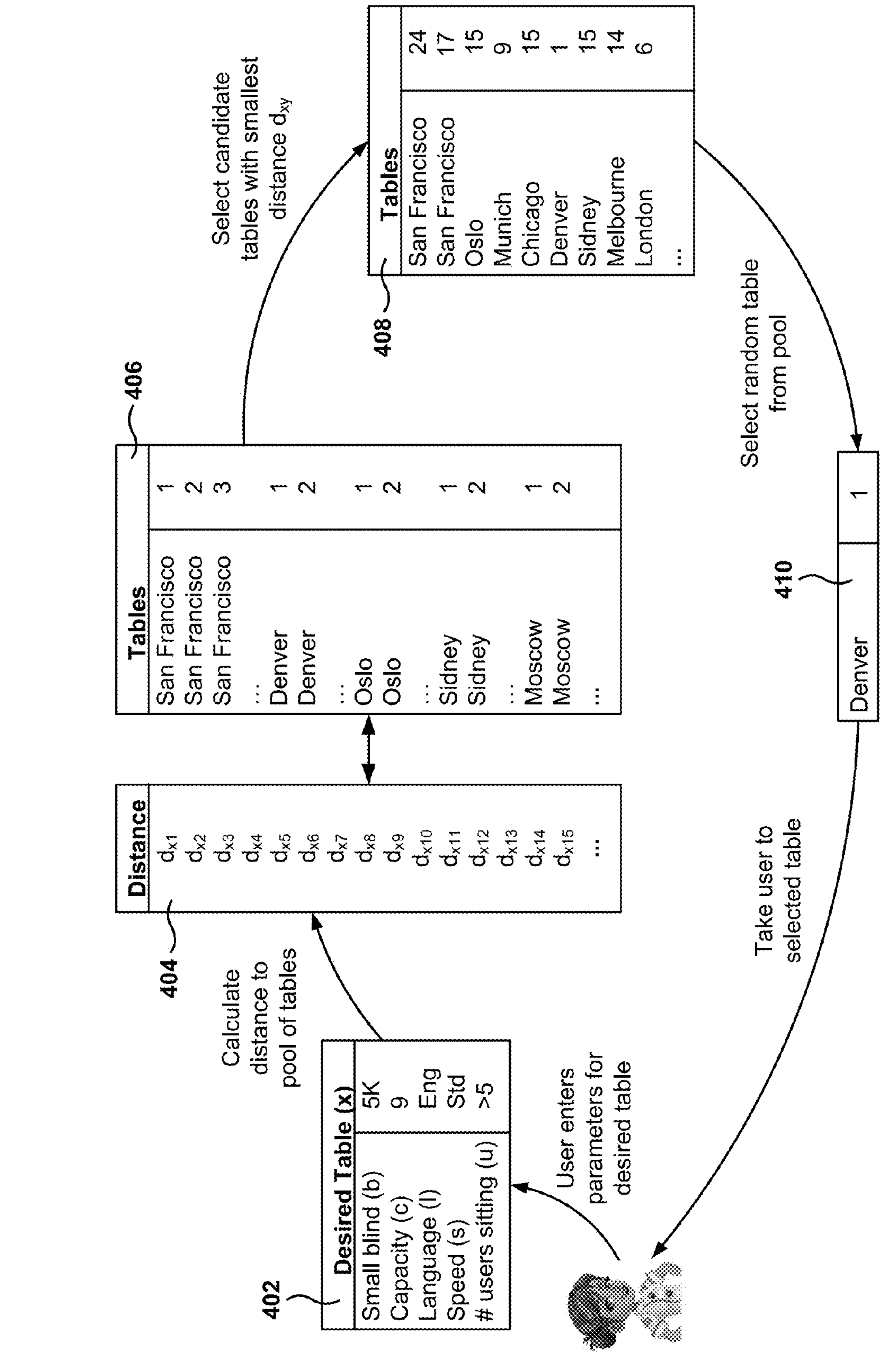
FIG. 4 illustrates a method for selecting a table for a player based on player-entered table parameters, according to one embodiment.

FIG. 4 illustrates a method for selecting a table for a player based on player-entered table parameters, according to one embodiment. In one embodiment, the player selects the parameters for the desired table 402. For example, the parameters may include the size of the small blind, the capacity of the table, the language of the server or the table, the playing speed of the table, and a minimum number of users currently sitting at the table.

The game calculates a parameter, referred to herein as the distance 404, which correlates the desired table 402 with the parameters of a given table. The closest the distance (i.e., the smaller the parameter is) the better that the table suits the desired parameters entered by the user. In other words, the distance measures how well a given table fits the requirements of the player.

In one embodiment, the distance is calculated with equation (1) described below, but other embodiments may utilize other formulas that measure the correlation between the desired table parameters and the actual parameters of a table in a server.

Let x be the room the user is looking for and y any room in the database. The following variables are identified for calculating the distance:

b is the small blind of the table (e.g., 500), c is the capacity of the table (e.g., 5, 9), l is the language of the server (e.g., English, Spanish, Korean, etc.), p is the table priority (1 if user opens the table and 0 otherwise), s is an integer associated with the table speed (e.g., 5 for normal speed, 10 for fast), $\tau$ is the room type fill rate, and u is the number of users currently sitting at the table, Additionally, a few on/off (e.g., Boolean) variables are identified:

$c_{xy}=0$ if $c_x=c_y$, $c_{xy}=1$ if $c_x \neq c_y$ $l_{xy}=0$ if $l_x=l_y$, $l_{xy}=1$ if $l_x \neq l_y$ $p_y=1$ if $y_u=1$ and the table was empty before, or $p_y=0$ otherwise.

Further, the small blind selected by the user $b_x$ is defined by the player when the player utilizes the table selector to select the table parameters. Otherwise, if the player selects the option "Play Now," without entering parameters, $b_x$ is set to a predetermined percentage of the player's total currency (e.g., 1%, 2%, 3%, although other values are also possible.

The table speed selected by the player $s_x$ is defined by the player when the player utilizes the table selector the table selector. Otherwise, $s_x$ is set to 10 (fast) by default. Further, the desired capacity of the table selected by the player $c_x$ is defined by the player with the table selector. Otherwise, $c_x$ is set to 5 by default.

The number of players that the table should have $u_x$ defined by the player is a constant, which depends on $c_x$. $u_x$ is utilized as a threshold to avoid sending players to a table that is almost full. For example, $u_x$ can be set by default to 6 or 7 for tables that seat 9 players, or 3 or 5 for tables that seat 5 players, although other values are also possible.

The language $l_x$ for the player is defined by the server to which the user is connected. In one embodiment, each login server has one language, but other embodiments may have servers that support more than one language. In another embodiment, the language $l_x$ for the player is based on the player's profile, which defines the preferred language for the player. Further, $\tau_x$ exists but is not necessary/used, and $p_x$ is not defined.

In one embodiment, the formula for the distance d(x, y) between rooms x and y is as follows:

$$d(x,y)=d_{roomType}(x,y)+d_{room}(x,y) \tag{1}$$

Where $d_{roomType}$ and $d_{room}$ are defined by the following:

$$d_{roomType}(x, y) = \omega_l \cdot l_{xy} + \omega_c \cdot c_{xy} + \omega_s\left(\frac{s_x - s_y}{s_x + s_y}\right) + \omega_b\left(\frac{b_x - b_y}{b_x + b_y}\right) + \omega_\tau(1 - \tau_y^2) \tag{2}$$

$$d_{room}(x, y) = \omega_u\left(1 - \frac{u_y}{u_x}\right) + \omega_p(1 - p_y) \tag{3}$$

Where $\omega_i$ are different coefficients that may be fine-tuned by the game provider. It is noted that $\omega_u$ is the table fill rate coefficient.

The distance from the desired table x to the pool of available tables 406 (e.g., San Francisco table 1, San Francisco table 2, San Francisco table 3, Denver table 1, etc.) is calculated with the distance formula (equation (1)). In one embodiment, the distance is an integer value, but in other embodiments the distance may be a real number. The tables are then sorted by their respective distance value, and then a plurality of tables 408 with the smallest distance to the x table are selected as candidates for selection to send to the player (e.g., San Francisco table 24, San Francisco table 17, Oslo table 15, etc).

It is noted that the distance is based on the characteristics of the user, so different users may get different distance values to the same tables, based on their profiles, their desires, or other parameters like their chip stack.

It is further noted that not all the candidate tables 408 may have the same distance value, and that tables might not be chosen as candidate tables even though their distance is similar to some of the candidate tables. For example, there could be 20 tables with a distance of 7, and only 15 of those tables may be chosen as candidates.

In one embodiment, a predetermined number of tables are selected as candidates from the top of the sorted list by decreasing distance value (e.g., a select the top 50 tables).

After the candidate tables are identified, a table 410 is chosen at random from the candidate pool of tables and then the user is sent to that server and that table to play the poker game.

In one embodiment, the random process assigns the same probabilities to all the candidate tables to be chosen for the player. In another embodiment, each table is given a probability for being selected based on their respective distance, where tables that are "closer" to the player will have a higher probability of being selected. But still, even with the use of probabilities, a random selection is performed.

In one embodiment, even though two players with similar profiles and in the same geography may select the same table parameters, it will be a low probability event that the two players will sit at the same table given the large pool of tables available.

In other embodiments, the distance formula may be further adjusted by taking into consideration the users currently sitting at a given poker table. For example, the candidate tables may be further rated based on the commonality of the player with the current players in the table. For example, the game may attempt to sit together players with the same chip stack, or that speak the same language, or that have similar interests in their social network profile (e.g., supporters for the same football club), have similar playing skills (e.g., number of hands played), etc.

It is noted that other distance formulas may take into consideration a fewer number of variables. For example, in one embodiment a second distance formula is based on the number of players sitting at the table, the small blind, and the total table capacity.

It is noted that the embodiments illustrated in FIG. 4 are exemplary. Other embodiments may utilize different distance formulas, consider additional parameters, consider fewer parameters in the distance equations, limit the player to a certain geography or subset of servers, etc. The embodiments illustrated in FIG. 4 should therefore not be interpreted to be exclusive or limiting, but rather exemplary or illustrative.

Figure 5:
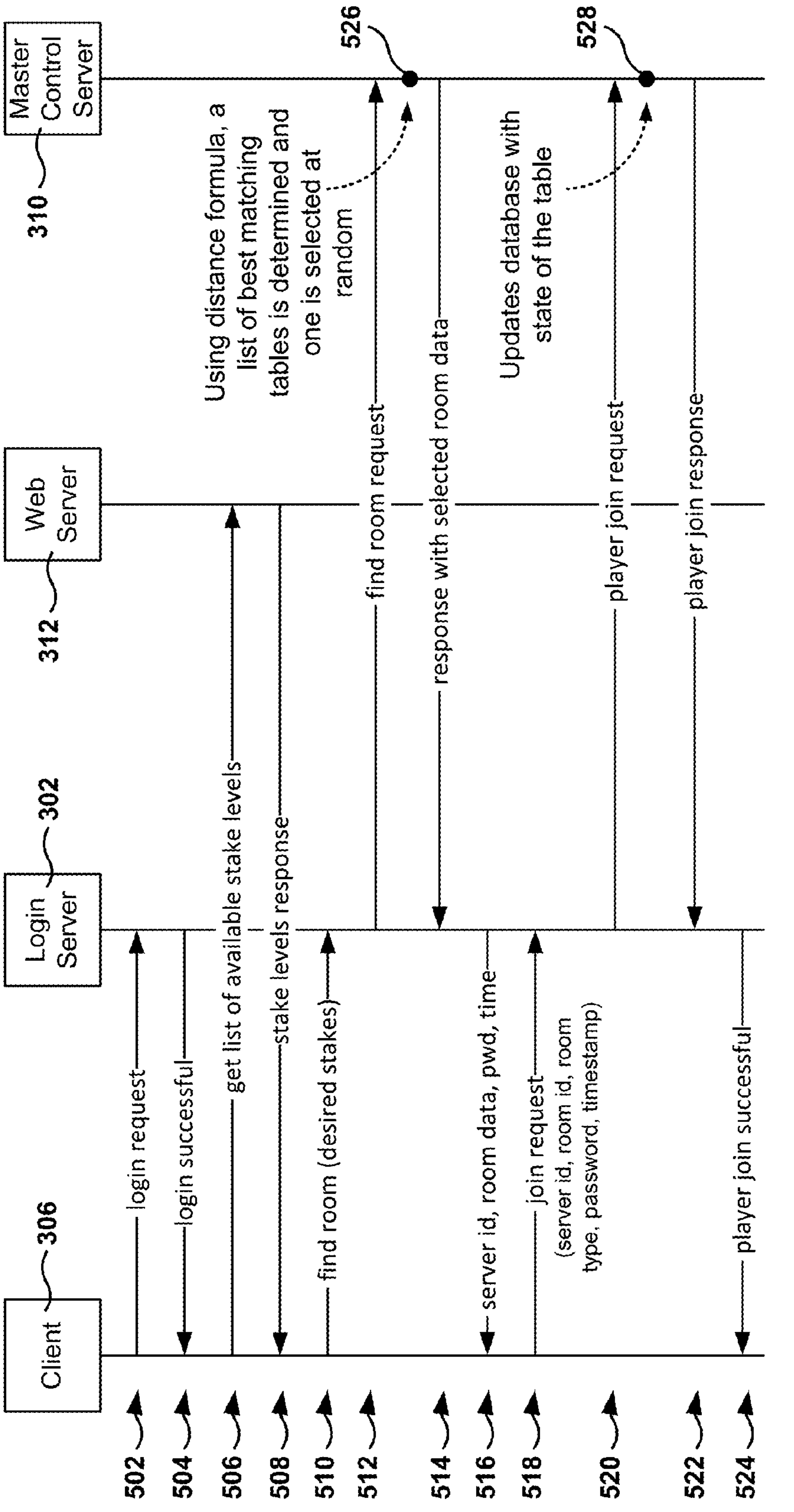
FIG. 5 illustrates the interactions between the client device and the different poker servers, according to one embodiment.

FIG. 5 illustrates the interactions between the client device and the different poker servers, according to one embodiment. In one embodiment, when the user accesses the game, a login server 302 provides the user interface for entering the game. The user sends a login request to login server 302, and in operation 504 the login server sends a login successful message to the client, assuming that the login credentials where correct.

In operation 506, the client device 306 sends a request to web server 312 for a list of available stake levels, which is a list of all the possible stake levels (e.g., small blind) in all the tables for the servers that the player may access. In operation 508, web server 312 responds to client 306 with the list of available stake levels.

Login server 302 presents the available stake levels to the player and after the player selects table stakes, client 306 sends a request 510 to login server 302 to find a room at the desired stakes.

Master control server 310 stores a list of the available tables at the available servers. In operation 512, login server 302 sends a find-room request to master control server 310 with the desired stakes and information about the player. In appraisal 526, master control server 310 utilizes the distance formula to select a table, as discussed above with reference to FIG. 4.

Master control server 310 responds 514 to the login server with the attributes of the chosen server and table. The login server 302 then sends 516 that table information to client device 306 with a password for joining the server and a timestamp.

In operation 518, the client sends a join request to login server 302 with the identity of the server, the room, the room type, the password, and the timestamp. The login server 302 then sends a player to join request 520 to the master control server 310. The master control server 310 then updates the database of servers and tables with the information of the new player at the table.

In another embodiment, the join request 518 is sent to the target server selected by master control server, instead of being sent to the login server 302. This way, the player starts interacting with the actual server where the player will play.

The master control server 310 then responds to the login server 302 that the player has been successfully joined, and the login server 302 sends a confirmation that the player has joined successfully the server in operation 524. At that point, the client device will start accessing the selected server to play the poker game.

In one embodiment, the server where the player is going to play is also notified of the new player, either by login server 302, or by master control server 310, or by client device 306. The connection of the player to the server where the player is going to play is secure, because the server is notified to expect the player to join at a given table. The client device is not able to select by itself which server to play in.

It is noted that the embodiments illustrated in FIG. 5 are exemplary. Other embodiments may combine the functionality of two or more servers into one (e.g., login server 302 provides the same functionality of web server 312), perform different operations for given the room information to the player, etc. The embodiments illustrated in FIG. 5 should therefore not be interpreted to be exclusive or limiting, but rather exemplary or illustrative.

The embodiments presented herein solve the technical problem of being able to manage a large number of players (e.g., 50,000, or 100,000, or more) that enter and exit the poker game at any time, while keeping the online game up and running 24 hours a day, 365 days a year. Further, the online game provides services to players that may be located in almost any part of the world, coordinate access of each player to one of a large number of servers, and make available a large number of poker rooms (e.g., 50, or 100, or more) in each of the servers. The distributed system provides consistency of data for the multiple databases associated with the game. The game databases may include a database for managing access (e.g., login) of users to the game through different portals (e.g., social network, game provider portal, third-party portals, portals for mobile players, etc.), a database for tracking the status of the plurality of servers and each of the rooms in the respective servers, and a database for managing game related information (e.g., user profile, user chip count, user social relationships, etc.).

Given the large number of users entering and exiting the game, the game provides capabilities for computational modules that can perform a large number of operations in a short amount of time, to avoid user frustration with long waits, or losing players that want to enter the game. For example, the computational modules include modules for calculating the distance from the table desired by a user, to a large number of poker tables, where each poker table is served by one of a plurality of servers.

The distributed system allows for the synchronization between different servers in the system to provide game services. For example, coordination between the game servers, or between a login server on the game servers, or coordination between a login server and the master control server, as discussed above.

The ability to perform a large number of calculations by a distributed system, enables the game to select a good table for the user, which may be the best table for the user or at least a very good match, while providing a degree of randomness to block illegal operations in the game by disallowing illegal sellers to meet with illegal buyers of game chips.

Figure 6A:
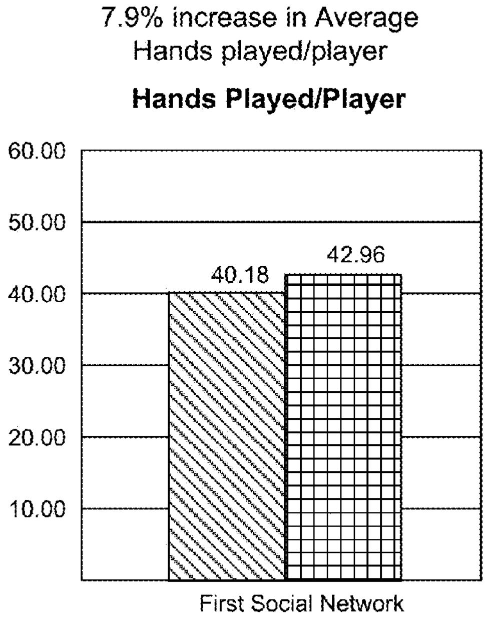
FIGS. 6A-6C present test results showing the performance improvements when implementing embodiments presented herein.
Figure 6B:
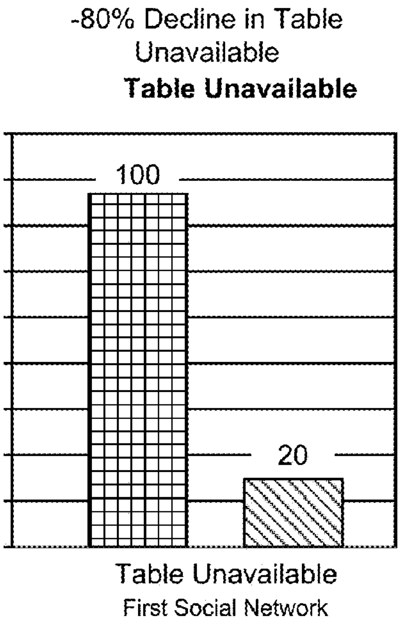
Figure 6C:
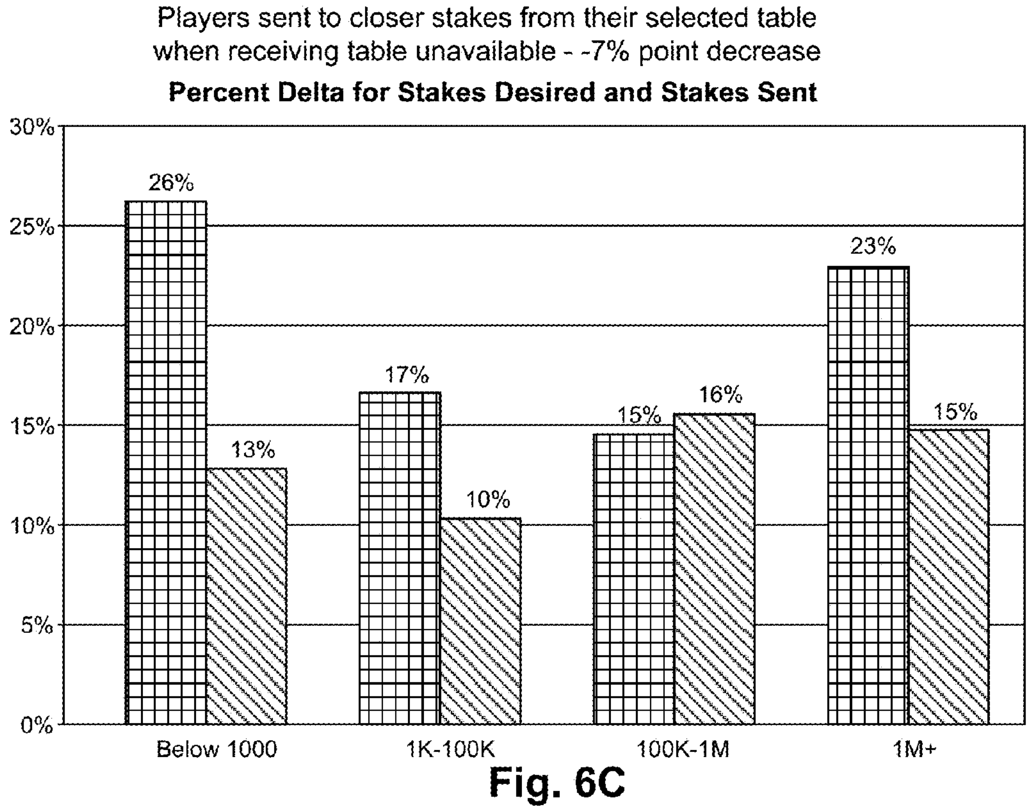

FIGS. 6A-6C present test results showing the performance improvements when implementing embodiments presented herein. Tests were performed in the online game before and after the improvements presented herein were introduced, and the results show significant improvements.

For example, FIG. 6A shows a 7.9% increase in the average number of hands played by player that accessed the game from the same social network. Additionally, FIG. 6B shows an 80% decline in the table unavailable message to users. Normalizing to 100 the number of table unavailable messages before the embodiments, the game only showed 1/5 of the table unavailable messages afterwards.

FIG. 6C shows that players were sent to tables with closer stakes to the desired stakes when receiving a table unavailable message, overall a 7% point decrease. The chart in FIG. 6C shows the results categorized by stake level. For example, in the stake level below 1000, players were sent to tables that were not close to their desire stakes only 13% of the times instead of 26% of the times.

Additionally, a positive result was noticed after taking out the option to select a server because the websites of the illegal chip players displayed messages of "out of stock," as the mechanism to transfer chips to buyers was eliminated.

Figure 7:
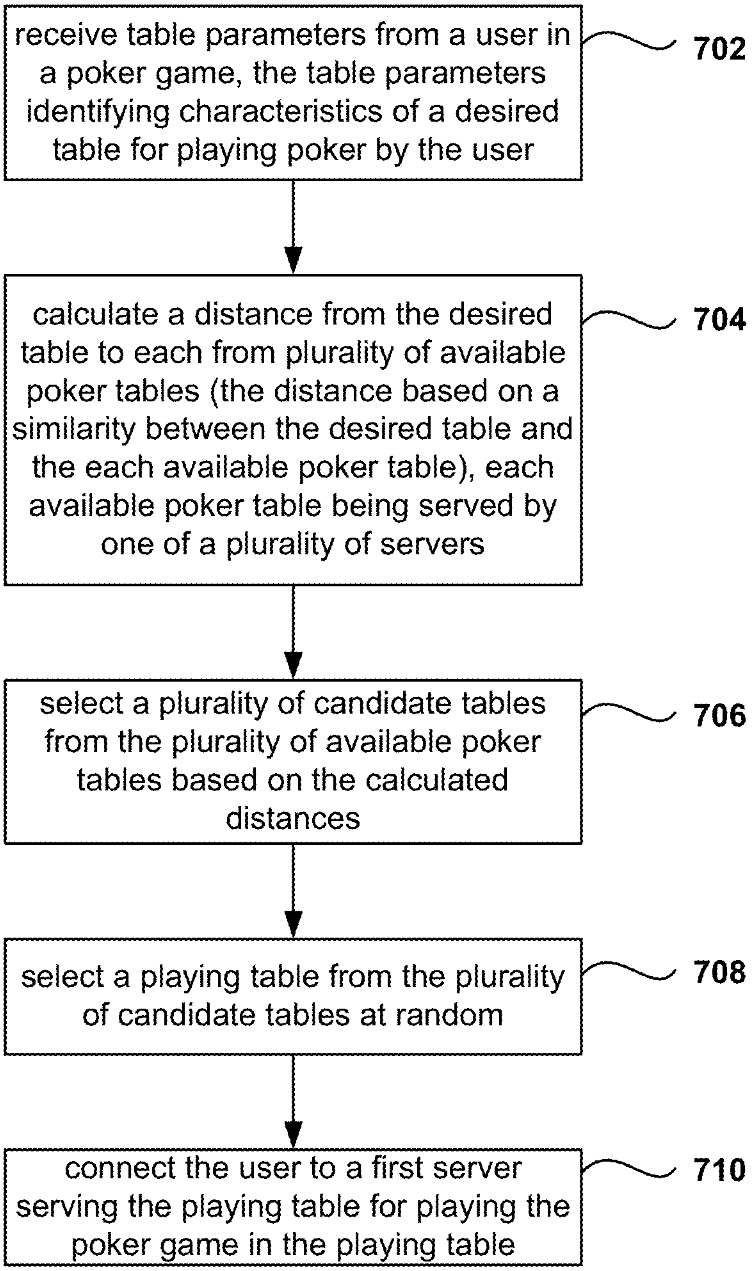
FIG. 7 is a flowchart illustrating an algorithm for selecting a poker server, according to one embodiment.

FIG. 7 is a flowchart illustrating an algorithm for selecting a poker server, according to one embodiment. While the various operations in this flowchart are presented and described sequentially, one of ordinary skill will appreciate that some or all of the operations may be executed in a different order, be combined or omitted, or be executed in parallel. Further, any of the method operations may be performed by a module that synchronizes with other modules performing other method operations or synchronizes with modules that perform other game operations.

Operation 702 is for receiving table parameters from a user in a poker game. The table parameters identify the characteristics of a desired table for playing poker by the user. For example, the table parameters may include the size of the small blind, the buy-in, and the maximum number of players in the table.

From operation 702, the method flows to operation 704, where a distance from the desired table is calculated to each from the plurality of available poker tables. The distance calculation is based on the similarity between the desired table and the available poker tables. Each available poker table is served by one of a plurality of servers (see for example, FIG. 3).

From operation 704, the method flows to operation 706 for selecting a plurality of candidate tables from the plurality of available poker tables based on the calculated distances. In one embodiment, the tables are sorted in increasing order according to the distance calculated and then a set of candidate tables are selected from the top of the sorted list. In one embodiment, a predetermined number of tables are selected as candidates, and in another embodiment all tables with a score below a score threshold are selected as candidates.

From operation 706, the method flows to operation 708 where a playing table is selected at random from the plurality of candidate tables. In one embodiment, the table is selected completely at random from the candidate tables, while in another embodiment the tables are given a probability of being chosen based on the distance.

From operation 708, the method flows to operation 710 where the user is connected to a first server serving the playing table for playing the poker game in the playing table.

Figure 8:
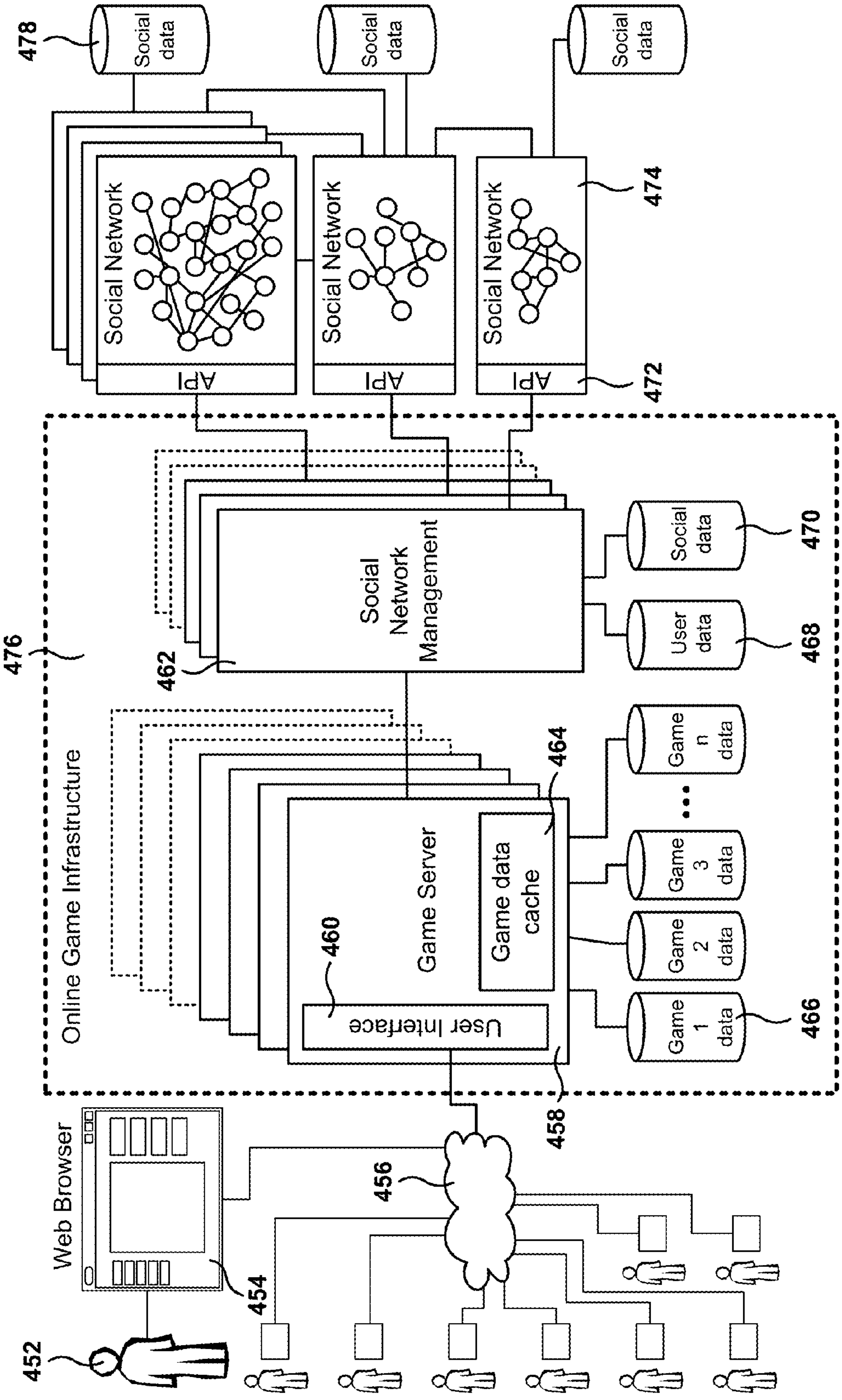
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 8 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 9:
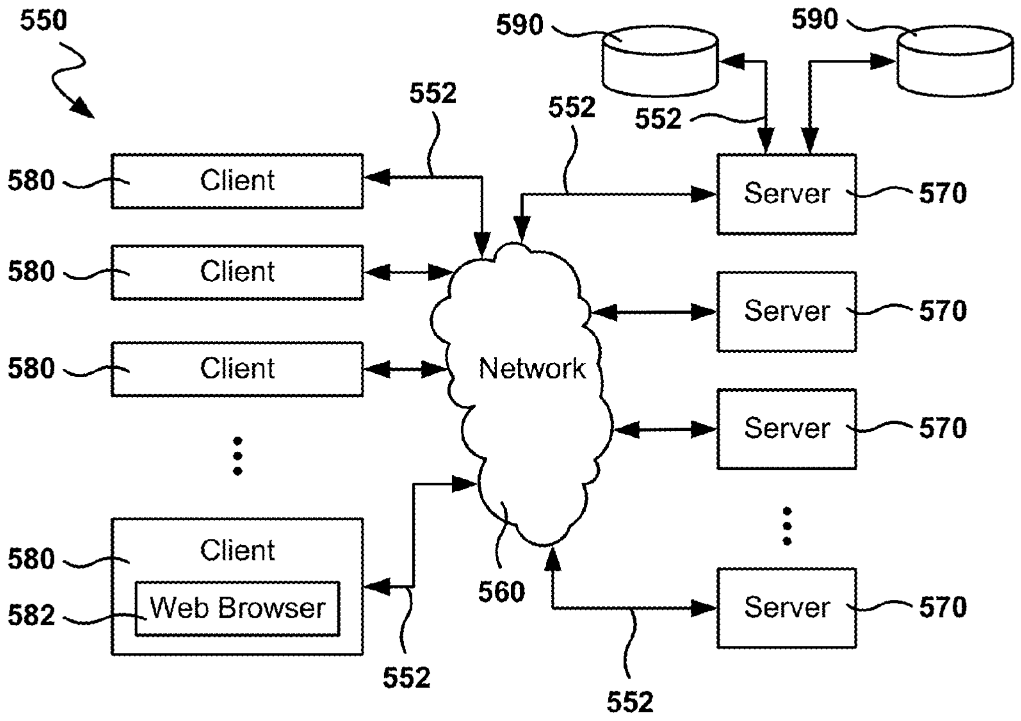
FIG. 9 illustrates an example network environment suitable for implementing embodiments.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
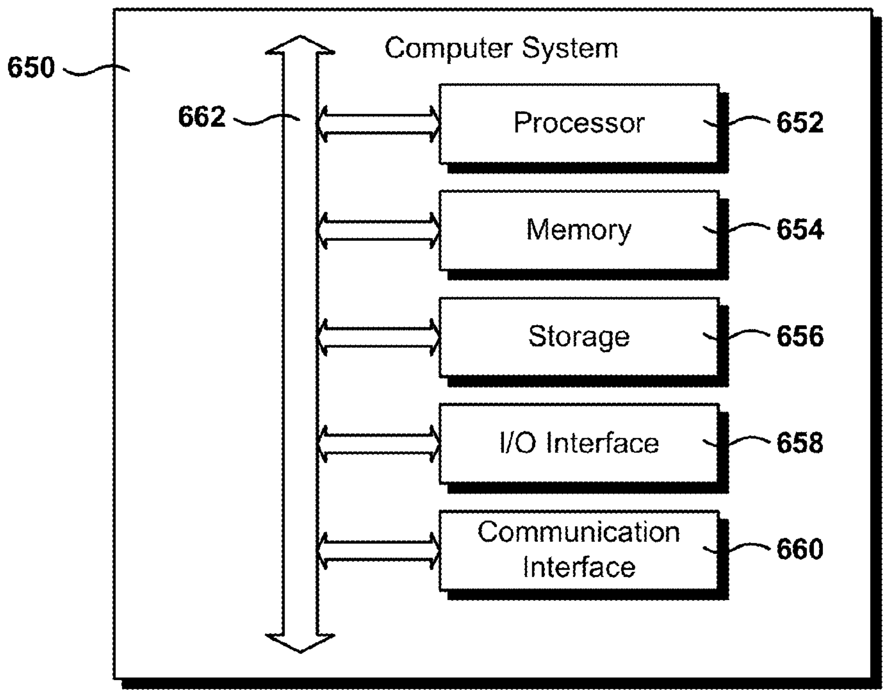
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. § 101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method comprising:

receiving table parameters from a first client device of a first player, the parameters identifying characteristics of a desired table of a first online game executing on a plurality of game servers, each game server supporting a plurality of tables of the first online game;

determining a plurality of candidate tables from a plurality of available tables for the online game based on the received table parameters, each available table being served by one of the plurality of game servers;

selecting a playing table from the plurality of candidate tables at random;

connecting the first client device of the first player to a first server serving the randomly selected playing table for playing the first online game;

receiving a login request from a second client device of a second player to access a gaming system providing one or more online games including the first online game;

accessing a user profile database of a social network, wherein each of the first player and the second player have a corresponding user profile on the social network;

determining that the first player is a friend of the second player in the social network based on corresponding user profiles of the first player and the second player;

providing an interface to the second client device, the interface configured for joining a selected online game; and providing an option in the interface to join the randomly selected playing table of the first online game currently played by the first player.

2. The method of claim 1, further comprising:

determining that the first player and the second player have been friends in the social network for over a threshold period.

3. The method of claim 1, wherein the online game is an online poker game.

4. The method as recited in claim 3, wherein the table parameters include one or more or small blind, table capacity, table language, speed of play, or number of users sitting at the table.

5. The method of claim 1, further comprising:

receiving a request from the second player to play the first online game at the selected playing table currently played by the first player; and connecting the second client device of the second player to a first server serving the randomly selected playing table for playing the first online game.

6. The method of claim 1, wherein the determining a plurality of candidate tables further comprises:

calculating a plurality of distances from the desired table to each of the plurality of available tables, the distances based on similarities between the table parameters of the desired table and corresponding table parameters of each available table; and selecting the plurality of candidate tables from the plurality of available tables based on the calculated distances.

7. The method as recited in claim 1, wherein the first player is not informed of an identification of the first server.

8. The method as recited in claim 1, wherein the receiving a login request from a second client device further comprises:

receiving the login request from a server supporting the social network.

9. A system comprising:

a login server for receiving table parameters from a first client device of a first player, the parameters identifying characteristics of a desired table of a first online game executing on a plurality of game servers, each game server supporting a plurality of tables of the first online game;

a web server for managing available parameters for a plurality of available tables, each available table being served by one of the plurality of game servers; and a master control server operable for:

determining a plurality of candidate tables from a plurality of available tables for the online game based on the received table parameters, each available table being served by one of the plurality of game servers;

selecting a playing table from the plurality of candidate tables at random;

connecting the first client device of the first player to a first server serving the randomly selected playing table for playing the first online game;

the login server further operable for:

receiving a login request from a second client device of a second player to access a gaming system providing one or more online games including the first online game;

accessing a user profile database of a social network, wherein each of the first player and the second player have a corresponding user profile on the social network;

determining that the first player is a friend of the second player in the social network based on corresponding user profiles of the first player and the second player;

providing an interface to the second client device, the interface configured for joining a selected online game; and providing an option in the interface to join the randomly selected playing table of the first online game currently played by the first player.

10. The system of claim 9, wherein the login server is further configured for:

determining that the first player and the second player have been friends in the social network for over a threshold period.

11. The system of claim 9, wherein the master control server is further configured for:

receiving a request from the second player to play the first online game at the selected playing table currently played by the first player; and connecting the second client device of the second player to a first server serving the randomly selected playing table for playing the first online game.

12. The system of claim 9, wherein the determining a plurality of candidate tables as performed by the master control server further comprises:

calculating a plurality of distances from the desired table to each of the plurality of available tables, the distances based on similarities between the table parameters of the desired table and corresponding table parameters of each available table; and selecting the plurality of candidate tables from the plurality of available tables based on the calculated distances.

13. A non-transitory computer-readable storage medium storing a computer program, the computer-readable storage medium comprising:

program instructions for receiving table parameters from a first client device of a first player, the parameters identifying characteristics of a desired table of a first online game executing on a plurality of game servers, each game server supporting a plurality of tables of the first online game;

program instructions for determining a plurality of candidate tables from a plurality of available tables for the online game based on the received table parameters, each available table being served by one of the plurality of game servers;

program instructions for selecting a playing table from the plurality of candidate tables at random;

program instructions for connecting the first client device of the first player to a first server serving the randomly selected playing table for playing the first online game;

program instructions for receiving a login request from a second client device of a second player to access a gaming system providing one or more online games including the first online game;

program instructions for accessing a user profile database of a social network, wherein each of the first player and the second player have a corresponding user profile on the social network;

program instructions for determining that the first player is a friend of the second player in the social network based on corresponding user profiles of the first player and the second player;

program instructions for providing an interface to the second client device, the interface configured for joining a selected online game; and program instructions for providing an option in the interface to join the randomly selected playing table of the first online game currently played by the first player.

14. The computer-readable storage medium of claim 13, further comprising:

program instructions for determining that the first player and the second player have been friends in the social network for over a threshold period.

15. The computer-readable storage medium of claim 13, wherein the online game is an online poker game.

16. The computer-readable storage medium as recited in claim 15, wherein the table parameters include one or more or small blind, table capacity, table language, speed of play, or number of users sitting at the table.

17. The computer-readable storage medium of claim 13, further comprising:

program instructions for receiving a request from the second player to play the first online game at the selected playing table currently played by the first player; and program instructions for connecting the second client device of the second player to a first server serving the randomly selected playing table for playing the first online game.

18. The computer-readable storage medium of claim 13, wherein the program instructions for determining a plurality of candidate tables further comprises:

program instructions for calculating a plurality of distances from the desired table to each of the plurality of available tables, the distances based on similarities between the table parameters of the desired table and corresponding table parameters of each available table; and program instructions for selecting the plurality of candidate tables from the plurality of available tables based on the calculated distances.

19. The computer-readable storage medium as recited in claim 13, wherein the first player is not informed of an identification of the first server.

20. The method as recited in claim 13, wherein the program instructions for receiving a login request from a second client device further comprises:

program instructions for receiving the login request from a server supporting the social network.

* * * * *